April 11, 1933.  W. S. PRITCHARD  1,903,554
LUBRICATING SYSTEM
Filed June 13, 1927   2 Sheets-Sheet 1
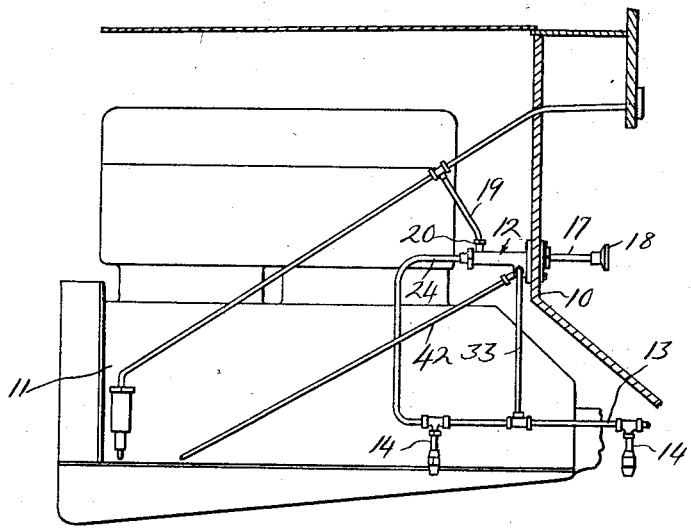
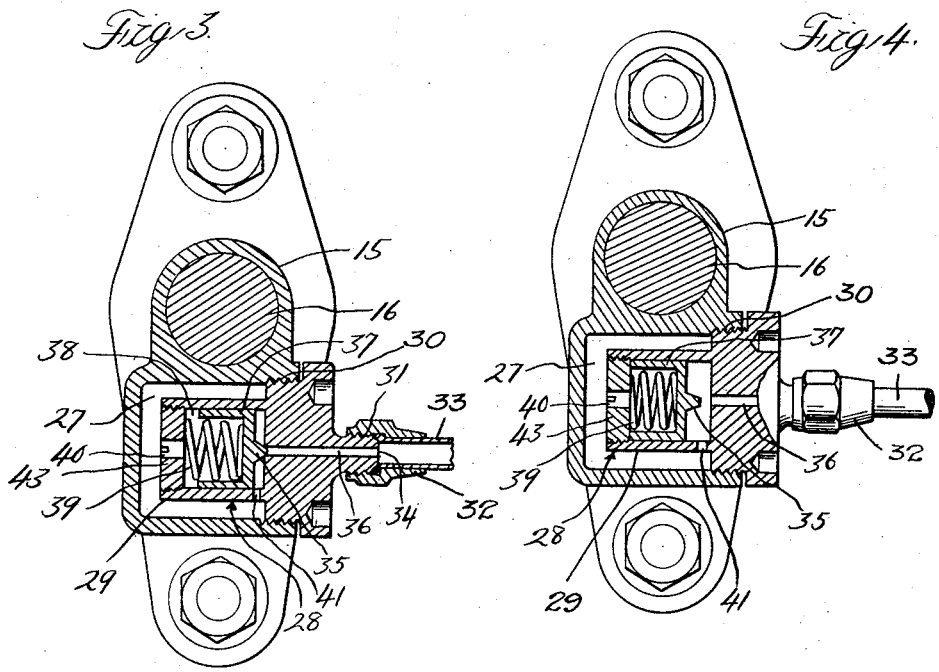
Inventor
William S. Pritchard
By Whittemore, Hulbert
Whittemore & Belknap
Attorneys

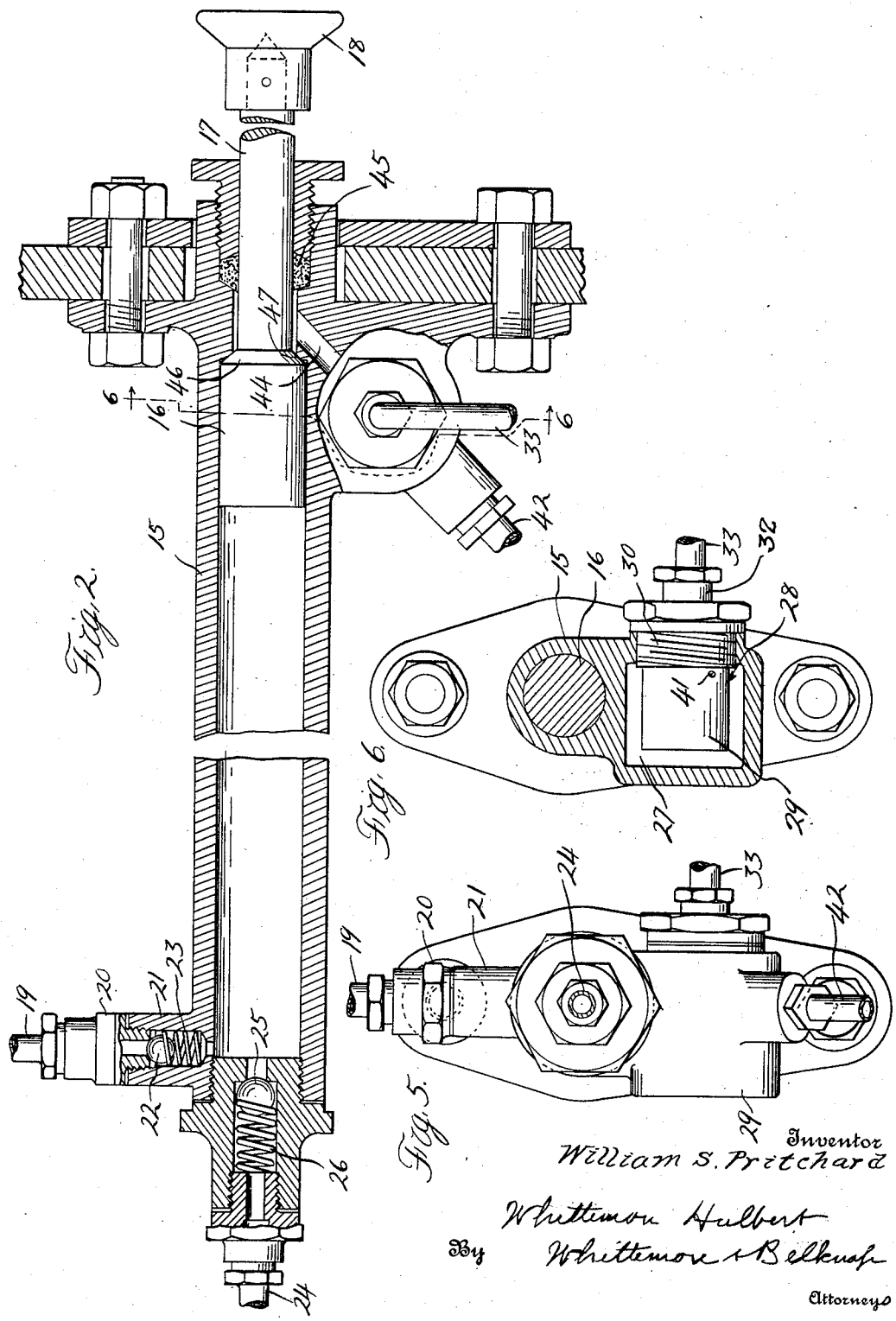

Patented Apr. 11, 1933

1,903,554

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

LUBRICATING SYSTEM

Application filed June 13, 1927. Serial No. 198,476.

This invention relates to lubricating systems and more particularly to a construction tending to simplify, render more efficient and improve generally apparatus of this character.

The invention finds particular utility in connection with centralized lubricating systems for motor vehicles and the like wherein lubricant is distributed from a central source to the several parts of the motor vehicle to be lubricated by means of a system of conduits and measuring valves located at the points of distribution.

Heretofore, with systems of this character, it has generally been the practice to provide a tank containing the supply of lubricant and to force the lubricant through the system of conduits by means of a pump associated with the tank. With such systems it has generally been necessary to provide an automatically operating by-pass to prevent the attainment of too great a pressure in the system and also a pressure relief valve operable to relieve the system of pressure after it has been ascertained that the several measuring valves have functioned. Such a system necessitated the employment of a separate pedal or other means for operating the relief valve and required attention on the part of the operator to insure a constant supply of oil in the tank. Furthermore in constructions where the pump is associated with the tank it has been necessary to make provisions for accommodating the tank at a point adjacent where it was found desirable or convenient to position the pump pedal. These requirements imposed by apparatus of this character heretofore used have made the same more or less objectionable and not readily adaptable to all types of motor vehicle structures.

It is, therefore, one of the primary objects of this invention to greatly simplify apparatus of this character by eliminating the necessity for a tank and a pedal operated relief valve; to provide an automatically operating relief and by-pass valve; to provide means for automatically supplying lubricant to the pump; and to produce a construction wherein the lubricant supply is obtained from, for instance, the crank case and the excess returned thereto whereby the number of parts required is reduced to a minimum and the cost of the apparatus consequently cheapened.

The several objects, advantages and novel details of construction of the invention will be made more apparent as this description proceeds, especially when considered in connection with the accompanying drawings wherein:

Figure 1 is a semi-diagrammatic elevational view of a lubricating system constructed in accordance with this invention.

Figure 2 is a detail longitudinal sectional view through the pump.

Figure 3 is a detail longitudinal sectional view through the relief and by-pass valve.

Figure 4 is a similar view with the valve in open position.

Figure 5 is an end elevation of the pump, and

Figure 6 is a sectional view taken on line 6—6 of Figure 2.

Referring now particularly to the drawings wherein like reference characters indicate like parts, and more especially to Figure 1, it will be noted that there is fragmentarily illustrated the toe board 10 and the crank case 11 of a motor vehicle. The reference character 12 indicates generally a pump, and 13 the system of conduits extending to the several parts of the vehicle which require lubrication, measuring valves or metering devices 14 being located at the several points of distribution throughout the system. The measuring valves or metering devices 14 are preferably, although not necessarily of the type and character shown in my copending application, Serial No. 60,583, filed October 5, 1925. With measuring valves of this general character a predetermined quantity of lubricant is discharged at each part to be lubricated, upon a building up of the pressure in the system and when the pressure in the system is relieved the several measuring valves return to their normal closed position.

By reference to Figures 1 and 2 it will be noted that the pump 12 consists essentially of a casing or housing provided with a longitudinally extending cylindrical chamber 15 in which a piston 16 reciprocates, this piston being operated by a plunger or rod 17 provided with a pedal 18. The chamber 15 of the pump is of sufficient capacity to hold a supply of lubricant which is more than ample to furnish a full charge to each of the measuring valves 14 arranged throughout the system. Lubricant is introduced into the chamber 15 through a conduit 19 which may be connected to the usual oil pump (not shown) arranged adjacent to or in the crank case or to the conduit extending from the pressure side thereof at any point in its length. The other end of this conduit 19 is connected by a fitting or coupling 20 to a nipple 21 projecting from the pump casing, communication between the conduit 19 and chamber 15 being controlled by means of a check valve, here shown as comprising a ball 22 and a relatively weak spring 23 normally seating the ball valve 22. While the strength of spring 23 is sufficient to retain ball 22 seated, in the absence of pressure in conduit 19, nevertheless, the pressure of the lubricant under the action of the pump in the crank case is sufficient to overcome spring 23 and to force lubricant through the conduit 19 into the chamber 15 to thus move the piston 16 to the position illustrated in Figure 2 thus filling the chamber 15 with a charge of lubricant. In this manner the pressure of the lubricant supplied to the pump is utilized for returning the piston to its normal position thus eliminating the necessity of using a spring for this purpose. The pump 12 constitutes a receiving device or reservoir for receiving and accumulating lubricant fed thereto by means of the usual oil pump of the engine or from the pressure conduit thereof. As will be later made more apparent, the lubricant thus collected may be subsequently delivered from this receiver to the system of conduits and valves leading to and located at the several points to be lubricated. The end of the pump is connected by means of a tube or conduit 24 to the system of conduits 13 and communication between the end of conduit 24 and chamber 15 is controlled by a valve, here shown as a ball, 25, normally held seated by means of a spring 26 capable of exerting a relatively greater pressure on the valve 25 than the spring 23 exerts upon its valve 22. Thus while both the ball valves 22 and 25 are capable of being automatically unseated, nevertheless, the strength of spring 26 is so selected that the pressure of the lubricant entering conduit 19 is insufficient to unseat valve 25. This valve will only unseat on the pressure stroke of the piston 16. As a consequence if the piston 16 has completed its pressure stroke and the engine of the motor vehicle is running the pump in the crank case will force lubricant through conduit 19 past valve 22 and into chamber 15 to thus move piston 16 into the position shown in Figure 2 and filling chamber 15 with lubricant. When it is desired to again force a supply of lubricant into the system of conduits 13 pedal 18 is operated to move piston 16 through the chamber 15 forcing the lubricant past valve 25 and through conduit 24 to the system of conduits 13. During the pressure stroke of piston 16, valve 22 is held seated. Associated with the pump 12 and preferably, although not necessarily, with a chambered offset 27 thereof is an automatic relief and by-pass valve 28. This valve consists essentially, see more particularly Figures 3 and 4, of a casing 29 externally threaded as at 30 for engagement with a threaded aperture formed in the wall of the chamber 27. An end of the casing 29 is externally threaded as indicated at 31 whereby connection is made by means of a coupling or fitting 32 with the end of a tube or conduit 33 constituting the return line for returning the excess lubricant from the system of conduits 13. The lubricant from conduit 33 flows into an inlet opening or passage 34 formed in the valve 28, this lubricant being controlled by means of a valve 35 which engages a relatively restricted portion 36 of the inlet. This valve 35 is operated by a piston 37 and in the embodiment herein shown is carried by this piston. This piston reciprocates in a chamber or cylinder 38, the piston being normally urged in the direction in which the valve 35 is seated by means of a spring 39. The end of the chamber 38 is apertured as indicated at 40 to prevent the formation of a vacuum or pressure in this end of the chamber. The chamber is provided with an aperture 41 communicating with chamber 27 and this chamber is, in turn, connected by means of a conduit 42 to the crank case so that the excess lubricant will flow back to the crank case.

It will be noted that by reason of the relatively restricted portion 36 of the inlet opening or passage 34 that only a very small portion or area of valve 35 is subjected to the pressure of the lubricant in the inlet opening 34 and return conduit 33 constituting a part of the system of conduits 13 which will be herein referred to as a pressure line. Thus the portion of the valve 35 subjected to the pressure in the pressure line is relatively small in comparison with the area of piston 37, the whole area of which is acted upon by spring 39. Consequently valve 35 and piston 37 constitute means having differential areas for controlling the return of the lubricant from the pressure line, the smaller area, that is valve 35, being normally subject to the pressure in the pressure line so that a relatively weak spring 39 may be employed for holding the parts in the position illustrated in Figure 2. Thus the valve will not open until a predetermined pressure has been obtained in the pressure line, which acting upon the small area of the valve, will be sufficient to overcome the spring 39 acting on the larger area of the piston. The pressure at which the valve will open may be conveniently regulated by closing the end of chamber 38 by means of a plug 43 threaded into the end of the valve casing for adjusting the tension of spring 39.

For example, if the ratio of the exposed area of the valve 35 to the piston 37 is one to one hundred and the spring 39 exerts a five pound pressure upon the piston 37 then it will be necessary for the pressure in the pressure line acting upon the valve 35 to attain a pressure exceeding five hundred pounds in order to move the valve to open position such as illustrated in Figure 4. However, immediately that the valve 35 opens the pressure enters chamber 38 and acts upon the larger area of piston 37 to thereby rapidly move this piston toward the right and to hold the same against the action of spring 39 until the pressure in the pressure line has been relieved to below five pounds whereupon the spring 39 will predominate to return the parts to the position illustrated in Figure 3. Obviously, immediately that the valve 35 opens, the lubricant in the pressure line flows into chamber 38 and out through relief opening 41 into chamber 27 and thence by conduit 42 back to the crank case. It is obvious therefore, that while in the example just given a pressure equal to or in excess of five hundred pounds is necessary to open the valve, nevertheless, when once opened any pressure in excess of five pounds will retain the valve in its open position thus insuring a complete relief of the pressure in the pressure line and acting in the meantime as an automatic by-pass valve should the operator continue to reciprocate the piston 16. Immediately upon the relief of the pressure in the pressure line below the pressure of the spring 39 the valve 35 will again seat and the piston 16 may again be operated to force lubricant through the system of conduits 13. By completely relieving the pressure in the pressure line the movable parts in the metering devices or pressure valves are permitted to again return to normal position.

The piston 16 is provided with a valve portion 46 which is adapted to seat on a valve seat 47 formed on the casing 12 so as to prevent the escape of lubricant past the piston when the latter is idle at the end of its stroke.

In order to insure against the escape of any lubricant which leaks past the piston 16, a passage 44 may be provided connecting the space behind the piston 16 with the chamber 27 so that any lubricant which finds its way behind the piston 16 will flow back into chamber 27 and thence to the crank case without leaking past the packing 45 of the stuffing box provided for the plunger 17.

In practice chamber 15 will be automatically supplied with lubricant whenever the engine of the motor vehicle is running, this lubricant being conducted to the chamber 15 through conduit 19 connected to the usual lubricant pump provided in the crank case. The pressure of the lubricant in chamber 15 returns the piston to the position illustrated in Figure 2 without requiring the use of a spring or other similar means for accomplishing this. Thereafter when piston 16 is forced through chamber 15 on its pressure stroke valve 22 will seat and valve 25 will open to thus force the lubricant from chamber 15 under pressure through the system of conduits 13 and through the measuring valves 14 at the points of distribution. If the relief and by-pass valve 28 is set to operate at five hundred pounds pressure, as in the example previously given, pressure to this extent will be built up in the pressure line or conduits 14 and in the return line 33 which forms a part thereof. While it is customary to construct the measuring valves or metering devices to function at a considerably less pressure, say for instance one hundred pounds, nevertheless, it is generally desirable to build up a pressure considerably in excess of that necessary to operate the valves to thus insure the operation of all of the valves, including those most remote from the pump and any which might stick or operate with difficulty for any other reason. However, while an excess pressure is desirable it is no less essential that means be provided for preventing the accumulation of too great a pressure and also to completely relieve the pressure line after each lubricating operation. With the present system, when for instance, a five hundred pound pressure has been accumulated then this pressure, acting from the smaller area of valve 35, will overcome the pressure of spring 39 to open the valve whereupon the lubricant in the pressure line escapes through chamber 38, relief port 41 into the chamber 27 and thence through conduit 42 back to the crank case. The valve 35 is held in open position until the pressure in the pressure line has fallen below the pressure exerted by spring 39 whereupon the valve 35 will again close. If, in the meantime the engine of the motor vehicle has been running, the crank case pump will again force lubricant through conduit 19 and fill chamber 15 again moving piston 16 into position for another lubricating operation.

The foregoing apparatus not only provides practical and efficient means for automatically by-passing pressure in excess of the desired amount and for completely relieving the pressure line and returning the parts to normal but accomplishes this with a structure which is distinguished by its simplicity and its ability to be economically manufactured and assembled with facility. Furthermore the necessity for a lubricant tank is eliminated and the number of parts required for a complete lubricating system is materially reduced. Furthermore the pump 12 may obviously be arranged at any point desired either upon the toe board, floor board, or dash or instrument board thus making the system adaptable for all types and design of vehicles.

While apparatus constructed and arranged substantially as herein illustrated and described somewhat in detail has been found to be entirely satisfactory in actual practice, nevertheless, it will be obvious to those skilled in this art that various changes in the details of construction and arrangement and relation of parts may be resorted to without departing from the spirit and scope of this invention and to this end reservation is made to make such changes as may come within the purview of the accompanying claims.

What I claim as my invention is:

1. In a lubricating system, the combination with a motor driven pump, of a system of conduits extending to the parts to be lubricated, a manually operated pump having a plunger for forcing lubricant under pressure through said conduits and means connecting said manual pump to the pressure side of said motor driven pump for supplying lubricant to the former and for moving said plunger in one direction.

2. In a lubricating system, the combination with a source of lubricant under pressure, of a system of conduits extending to the parts to be lubricated, a pump having a plunger for forcing lubricant through said conduits and means connecting said pump to said source of lubricant under pressure whereby the pressure of said lubricant moves the said plunger in one direction.

3. In a lubricating system, the combination with a crank case lubricant pump, of a manually operated pump having a member movable to discharge lubricant, a conduit connected thereto and extending to the part to be lubricated and a conduit connecting the pressure side of said crank case pump to said manually operated pump for supplying the latter with lubricant and for moving said movable member to a position where the same is adapted to be actuated to discharge lubricant from said pump.

4. In a lubricating system, the combination with a motor driven pump, of a lubricant receiving chamber having a plunger reciprocably mounted therein, a conduit extending from the chamber to a part to be lubricated and operable upon movement of the plunger from its normal position in one direction to transfer lubricant from the chamber to the part to be lubricated, and a second conduit establishing communication between the motor driven pump and chamber for supplying lubricant to the latter and for automatically returning said plunger to its normal position within the chamber.

5. In a lubricating system, the combination with a source of lubricant under pressure, of a conduit extending to a part to be lubricated, a manually operable pump having a lubricant chamber and having a plunger movable in one direction for forcing lubricant under pressure from the chamber through said conduit, and means connecting the manual pump to the source of lubricant under pressure for supplying lubricant to said chamber and for automatically moving said plunger in a direction opposite the direction of movement thereof aforesaid.

6. In a lubricating system, a source of lubricant under pressure, a lubricant receiving chamber having a relief opening therein and having a discharge opening spaced from the relief opening and communicating with a part to be lubricated, a plunger reciprocably mounted within the chamber between the aforesaid openings and operable upon movement in one direction to force lubricant from the chamber through the discharge opening to the part to be lubricated, and a conduit extending from the source of lubricant under pressure to the chamber for supplying lubricant to the latter and for automatically moving said plunger in a direction opposite the direction of movement thereof aforesaid.

In testimony whereof I affix my signature.

WILLIAM S. PRITCHARD.